(12) United States Patent
Fukumoto et al.

(10) Patent No.: US 11,959,795 B2
(45) Date of Patent: Apr. 16, 2024

(54) COMBINATIONAL WEIGHER WITH UPSTREAM X-RAY WEIGHER, AND DOWNSTREAM X-RAY INSPECTION

(71) Applicant: NICHIREI FOODS INC., Tokyo (JP)

(72) Inventors: Kenji Fukumoto, Ritto (JP); Takao Eto, Hachioji (JP); Kazuro Ishiyama, Tokyo (JP); Shinya Tsukamoto, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 434 days.

(21) Appl. No.: 17/437,373

(22) PCT Filed: Mar. 11, 2020

(86) PCT No.: PCT/JP2020/010651
§ 371 (c)(1),
(2) Date: Sep. 8, 2021

(87) PCT Pub. No.: WO2020/184633
PCT Pub. Date: Sep. 17, 2020

(65) Prior Publication Data
US 2022/0307892 A1    Sep. 29, 2022

(30) Foreign Application Priority Data

Mar. 11, 2019 (JP) ................. 2019-043867

(51) Int. Cl.
*G01G 19/387*    (2006.01)
*B65B 57/10*    (2006.01)
(Continued)

(52) U.S. Cl.
CPC .......... *G01G 19/387* (2013.01); *B65B 57/10* (2013.01); *G01G 9/00* (2013.01)

(58) Field of Classification Search
CPC ........ G01G 9/00; G01G 9/005; G01G 19/387; G01G 19/393; G01G 11/00; G01G 11/006; B65B 57/10
See application file for complete search history.

(56) References Cited

U.S. PATENT DOCUMENTS 5,585,603 A * 12/1996 Vogeley, Jr. ........... G01G 9/005
177/1
7,028,723 B1 * 4/2006 Alouani ................. G16H 20/13
141/94

(Continued)

FOREIGN PATENT DOCUMENTS

| CN | 101516731 A | 8/2009 |
| CN | 101611296 A | 12/2009 |

(Continued)

OTHER PUBLICATIONS

International Preliminary Report on Patentability and English translation of the Written Opinion of the International Searching Authority for International Application No. PCT/JP2020/010651, dated Sep. 23, 2021.

(Continued)

*Primary Examiner* — Randy W Gibson
(74) *Attorney, Agent, or Firm* — Birch, Stewart, Kolasch & Birch, LLP

(57) ABSTRACT

A combined weighing system 1 includes a first X-ray inspection device 20, a combined weighing device 40, a bag making and packaging device 50, a weight inspection device 60, a second X-ray inspection device 70, and a management device 90 that manages each device. The management device 90 revises a weight conversion table of the first X-ray inspection device 20 and a correction value of the combined weighing device 40 based on an average value of weights of (Continued)

products B, which is calculated from a result of inspection over a certain time period in the weight inspection device 60.

6 Claims, 7 Drawing Sheets

(51) Int. Cl.
*B65G 57/10* (2006.01)
*G01G 9/00* (2006.01)

(56) References Cited

U.S. PATENT DOCUMENTS

| | | | |
|---|---|---|---|
| 9,945,714 B1* | 4/2018 | Hartwig | G01G 9/005 |
| 11,237,040 B2* | 2/2022 | Iwasa | G01G 23/32 |
| 2010/0046703 A1 | 2/2010 | Hirose | |
| 2010/0115886 A1 | 5/2010 | Takayama et al. | |
| 2011/0082660 A1 | 4/2011 | Kimura | |
| 2017/0211966 A1 | 7/2017 | Monz et al. | |
| 2018/0106660 A1 | 4/2018 | Hartwig | |

FOREIGN PATENT DOCUMENTS

| | | |
|---|---|---|
| CN | 101779108 A | 7/2010 |
| CN | 101922961 A | 12/2010 |
| CN | 107430079 A | 12/2017 |
| EP | 3078944 A1 | 10/2016 |
| JP | 9-127017 A | 5/1997 |
| JP | 2009-175005 A | 8/2009 |
| JP | 2011-203067 A | 10/2011 |
| JP | 2013-64367 A | 4/2013 |
| JP | 2017-519198 A | 7/2017 |
| WO | WO2016/164411 A1 | 10/2018 |

OTHER PUBLICATIONS

International Search Report for International Application No. PCT/JP2020/010651, dated May 26, 2020.

* cited by examiner

COMBINATIONAL WEIGHER WITH UPSTREAM X-RAY WEIGHER, AND DOWNSTREAM X-RAY INSPECTION

TECHNICAL FIELD

The present invention relates to a combined weighing system, a combined weighing method, and a combined weighing program.

BACKGROUND ART

In the related art, a system has been known in which when the weight of an article is inspected and the weight of the article is a certain quantity or less, the article is rejected as a defective article (for example, refer to Patent Literature 1).

CITATION LIST

Patent Literature

Patent Literature 1: Japanese Unexamined Patent Publication No. 2009-175005

SUMMARY OF INVENTION

Technical Problem

There is a product in which a plurality of articles are packaged in a bag. A certain quantity of the articles is contained in the product. However, even when the weights of the articles are constant, if the sizes of the individual articles differ from each other, the number of the articles to be packaged in the bag of the product may vary. In this case, consumers may have a sense of discomfort, which is a concern. For this reason, the product is required to have a certain quantity of weight, and include a uniform number of the articles. However, in a weight inspection device of the related art, even when the accuracy of the weights of articles is improved, the number of the articles cannot be controlled to be constant. In addition, when the number of articles takes priority in packaging, the accuracy of the weights of the articles deteriorates, which is a problem.

An object of one aspect of the present invention is to provide a combined weighing system, a combined weighing method, and a combined weighing program capable of improving the accuracy of the weights and the number of articles.

Solution to Problem

A combined weighing system according to one aspect of the present invention includes: a first X-ray inspection device that irradiates articles with X-rays to acquire first X-ray images, detects weights of the articles based on the first X-ray images and a weight conversion table set in advance, and inspects whether or not an average value over a certain time period of unit weight values is in an allowable weight range, the unit weight value representing a weight of one article; a combined weighing device that performs combined weighing on the articles, which have been inspected by the first X-ray inspection device, so as to acquire a weight obtained by adding a correction value to a combination lower limit value, and supplies the articles on which the combined weighing has been performed; a packaging device that packages a plurality of the articles, which are combined by the combined weighing device, in a bag; a weight inspection device that inspects weights of packages in each of which the plurality of articles are packaged in the bag; a second X-ray inspection device that irradiates the packages, which have been inspected by the weight inspection device, with X-rays to acquire second X-ray images, and inspects the number of the plurality of articles in each of the packages based on the corresponding second X-ray image; and a management device that manages each device. The management device revises the weight conversion table of the first X-ray inspection device and the correction value of the combined weighing device based on an average value of the weights of the packages, which is calculated from a result of the inspection over a certain time period in the weight inspection device.

In the combined weighing system according to one aspect of the present invention, the weight conversion table of the first X-ray inspection device and the correction value of the combined weighing device are revised based on the average value of the weights of the packages, which is calculated from the result of the inspection over the certain time period in the weight inspection device. Accordingly, in the combined weighing system, the weight conversion table and the correction value can be appropriately set. Therefore, in the combined weighing system, the accuracy of the inspection performed by the first X-ray inspection device and the accuracy of the combination performed by the combined weighing device can be improved.

In one embodiment, the management device may revise the allowable weight range of the first X-ray inspection device based on the average value of the unit weight values of the articles, which is calculated from the inspection result of the weight inspection device and a detection result of the second X-ray inspection device. In this configuration, the allowable weight range can be appropriately set. Therefore, in the combined weighing system, the weights of the articles to be supplied to the combined weighing device can be appropriately set, and the accuracy of the combined weighing in the combined weighing device can be improved.

A combined weighing method according to one aspect of the present invention is a combined weighing method to be executed by a combined weighing system including a first X-ray inspection device that irradiates articles with X-rays to acquire first X-ray images, detects weights of the articles based on the first X-ray images and a weight conversion table set in advance, and inspects whether or not an average value over a certain time period of unit weight values is in an allowable weight range, the unit weight value representing a weight of one article, a combined weighing device that performs combined weighing on the articles, which have been inspected by the first X-ray inspection device, so as to acquire a weight obtained by adding a correction value to a combination lower limit value, and supplies the articles on which the combined weighing has been performed, a packaging device that packages a plurality of the articles, which are combined by the combined weighing device, in a bag, a weight inspection device that inspects weights of packages in each of which the plurality of articles are packaged in the bag, a second X-ray inspection device that irradiates the packages, which have been inspected by the weight inspection device, with X-rays to acquire second X-ray images, and inspects the number of the plurality of articles in each of the packages based on the corresponding second X-ray image, and a management device that manages each device. The management device revises the weight conversion table of the first X-ray inspection device and the correction value of the combined weighing device based on an average value of the weights of the packages, which is calculated from a result of the inspection over a certain time period in the weight inspection device.

In the combined weighing method according to one aspect of the present invention, the weight conversion table of the first X-ray inspection device and the correction value of the combined weighing device are revised based on the average value of the weights of the packages, which is calculated from the result of the inspection over the certain time period in the weight inspection device. Accordingly, in the combined weighing method, the weight conversion table and the correction value can be appropriately set. Therefore, in the combined weighing method, the accuracy of the inspection performed by the first X-ray inspection device and the accuracy of the combination performed by the combined weighing device can be improved.

In one embodiment, the management device may revise the allowable weight range of the first X-ray inspection device based on the average value of the unit weight values of the articles, which is calculated from the inspection result of the weight inspection device and a detection result of the second X-ray inspection device. In this method, the allowable weight range of the first X-ray inspection device is revised based on the average value of the unit weight values of the articles, which is calculated from the inspection result of the weight inspection device and the detection result of the second X-ray inspection device. Accordingly, in the combined weighing method, the allowable weight range can be appropriately set. Therefore, in the combined weighing method, the weights of the articles to be supplied to the combined weighing device can be appropriately set, and the accuracy of the combined weighing in the combined weighing device can be improved.

A combined weighing program according to one aspect of the present invention is a combined weighing program that causes a computer of a management device to execute functions in a combined weighing system including a first X-ray inspection device that irradiates articles with X-rays to acquire first X-ray images, detects weights of the articles based on the first X-ray images and a weight conversion table set in advance, and inspects whether or not an average value over a certain time period of unit weight values is in an allowable weight range, the unit weight value representing a weight of one article, a combined weighing device that performs combined weighing on the articles, which have been inspected by the first X-ray inspection device, so as to acquire a weight obtained by adding a correction value to a combination lower limit value, and supplies the articles on which the combined weighing has been performed, a packaging device that packages a plurality of the articles, which are combined by the combined weighing device, in a bag, a weight inspection device that inspects weights of packages in each of which the plurality of articles are packaged in the bag, a second X-ray inspection device that irradiates the packages, which have been inspected by the weight inspection device, with X-rays to acquire second X-ray images, and inspects the number of the plurality of articles in each of the packages based on the corresponding second X-ray image, and the management device that manages each device. The weight conversion table of the first X-ray inspection device and the correction value of the combined weighing device are revised based on an average value of the weights of the packages, which is calculated from a result of the inspection over a certain time period in the weight inspection device.

In the combined weighing program according to one aspect of the present invention, the weight conversion table of the first X-ray inspection device and the correction value of the combined weighing device are revised based on the average value of the weights of the packages, which is calculated from the result of the inspection over the certain time period in the weight inspection device. Accordingly, in the combined weighing program, the weight conversion table and the correction value can be appropriately set. Therefore, in the combined weighing program, the accuracy of the inspection performed by the first X-ray inspection device and the accuracy of the combination performed by the combined weighing device can be improved.

In one embodiment, the allowable weight range of the first X-ray inspection device may be revised based on the average value of the unit weight values of the articles, which is calculated from the inspection result of the weight inspection device and a detection result of the second X-ray inspection device. In this program, the allowable weight range of the first X-ray inspection device is revised based on the average value of the unit weight values of the articles, which is calculated from the inspection result of the weight inspection device and the detection result of the second X-ray inspection device. Accordingly, in the combined weighing program, the allowable weight range can be appropriately set. Therefore, in the combined weighing program, the weights of the articles to be supplied to the combined weighing device can be appropriately set, and the accuracy of the combined weighing in the combined weighing device can be improved.

Advantageous Effects of Invention

According to one aspect of the present invention, the accuracy of the weights and the number of the articles can be improved.

DESCRIPTION OF EMBODIMENTS

Hereinafter, a preferred embodiment of the present invention will be described in detail with reference to the accompanying drawings. Incidentally, in the description of the drawings, the same reference signs are assigned to the same or equivalent components, and duplicated descriptions will be omitted.

Figure 1:
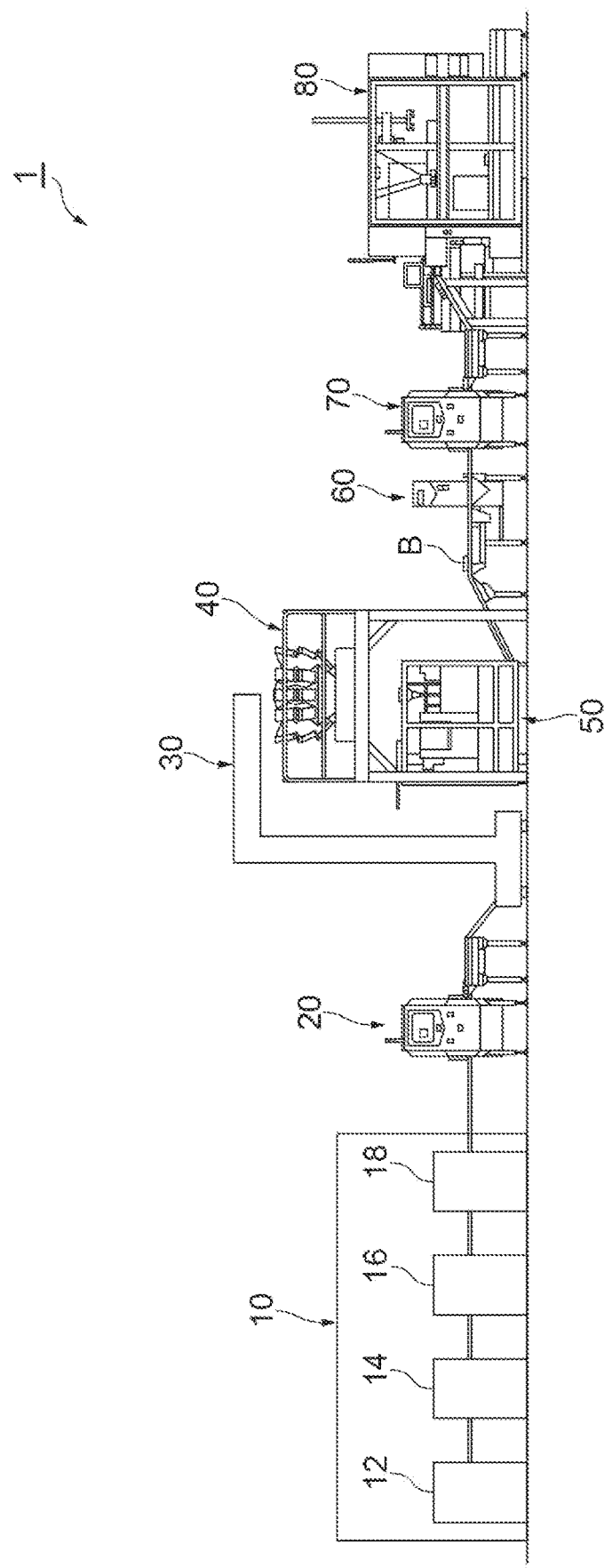
FIG. 1 is a view illustrating a combined weighing system according to one embodiment.
Figure 6:
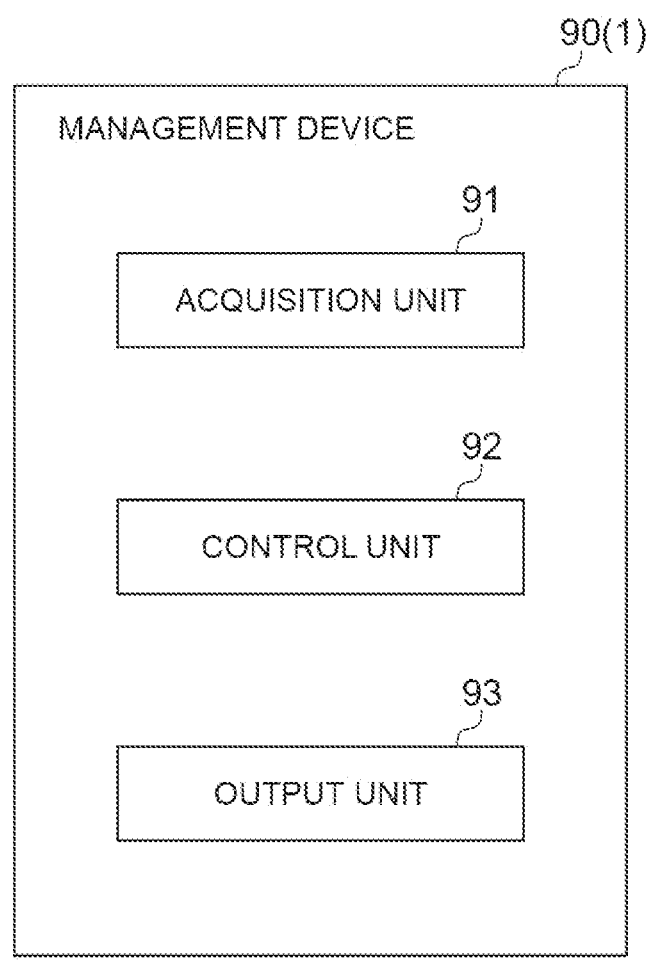
FIG. 6 is a diagram illustrating a configuration of a management device.

As illustrated in FIG. 1, a combined weighing system 1 includes an article production device 10, a first X-ray inspection device 20, a conveying device 30, a plurality of combined weighing devices 40, a bag making and packaging device 50, a weight inspection device 60, a second X-ray inspection device 70, a box packing device 80, and a management device 90 (refer to FIG. 6). The article production device 10, the first X-ray inspection device 20, the conveying device 30, the plurality of combined weighing devices 40, the bag making and packaging device 50, the weight inspection device 60, the second X-ray inspection device 70, and the box packing device 80 are communicably connected to the management device 90. In the combined weighing system 1, articles A (refer to FIG. 2) are produced, and products (packages) B in each of which the articles A are packaged are packed in a box.

The article production device 10 processes raw materials to produce the article A that is a food. For example, when the article A is a croquette, the article production device 10 includes a mixer 12, a molding machine 14, a battering machine 16, and a fryer 18.

The mixer 12 mixes raw materials. In the mixer 12, seasonings or the like may be added to the mixed raw materials. The mixer 12 supplies the mixed workpiece to the molding machine 14. The molding machine 14 supplies the molded workpiece to the battering machine 16.

The battering machine 16 performs battering on the workpiece supplied from the molding machine 14. The battering machine 16 supplies the food to the fryer 18. The fryer 18 fries the workpiece, which is supplied from the battering machine 16, in oil. The fryer 18 supplies the article A, which is fried in oil, to the first X-ray inspection device 20. Incidentally, the workpiece or the food may be temporarily stored between the machines (processes).

The first X-ray inspection device 20 inspects the article A. While the first X-ray inspection device 20 conveys the article A, the first X-ray inspection device 20 generates an X-ray transmission image (first X-ray image) of the article A to inspect the article A based on the X-ray transmission image. In the present embodiment, the first X-ray inspection device 20 inspects whether or not the average value over a certain time period of unit weight values is in an allowable weight range, the unit weight value representing the weight of one article A (hereinafter, simply referred to as a "unit weight value").

Figure 2:
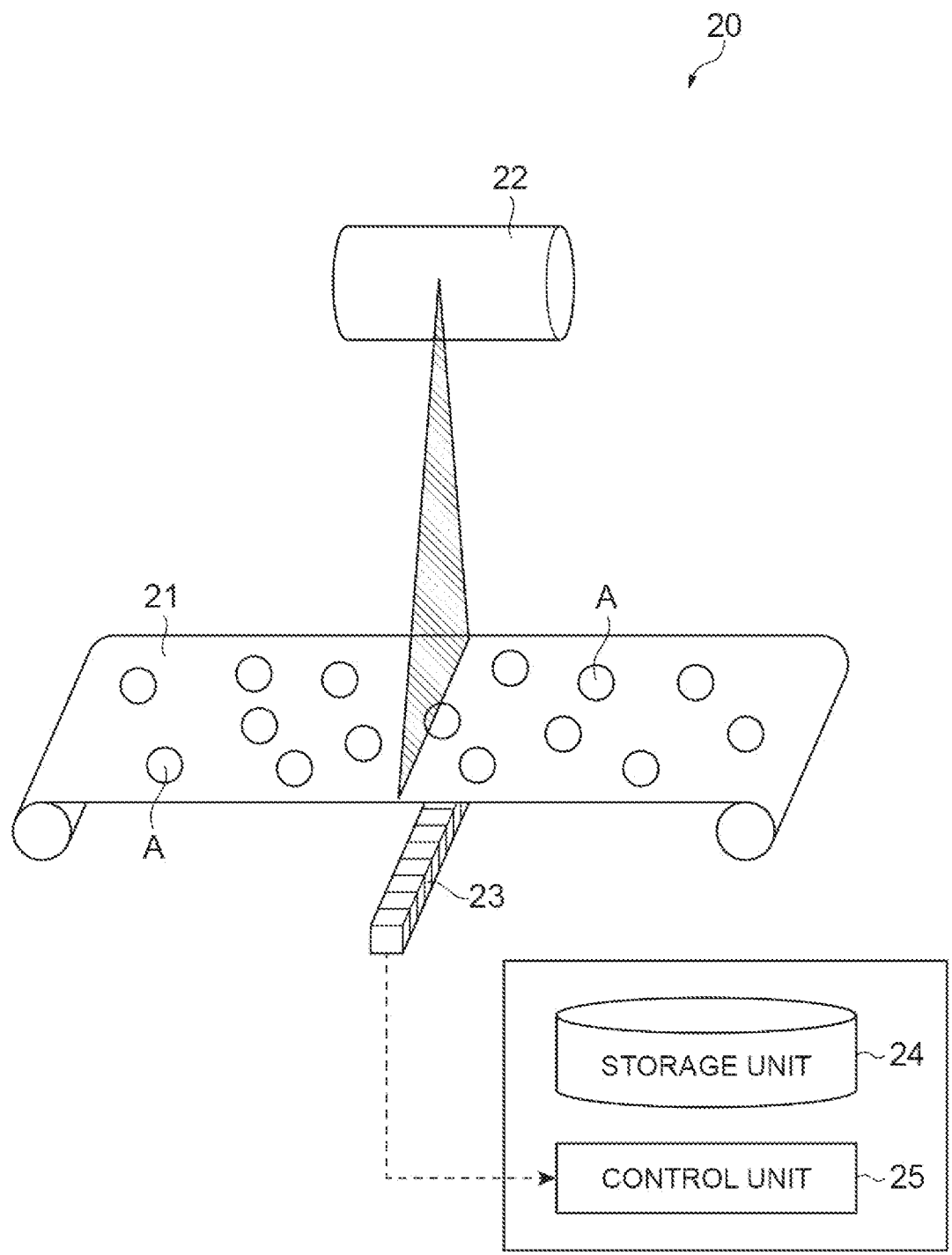
FIG. 2 is a view illustrating a configuration of a first X-ray inspection device.

As illustrated in FIG. 2, the first X-ray inspection device 20 includes a conveying unit 21, an X-ray irradiation unit 22, an X-ray detection unit 23, a storage unit 24, and a control unit 25.

The conveying unit 21 is disposed inside a shielded box not illustrated. The conveying unit 21 is, for example, a belt conveyor. The X-ray irradiation unit 22 is disposed inside the shielded box. The X-ray irradiation unit 22 irradiates the article A, which is conveyed by the conveying unit 21, with X-rays. The X-ray irradiation unit 22 includes, for example, an X-ray tube that emits X-rays and a collimator that spreads the X-rays, which are emitted from the X-ray tube, in a fan shape in a plane perpendicular to a conveyance direction of the conveying unit 21 (hereinafter, simply referred to as a "conveyance direction"). The X-ray detection unit 23 is disposed inside the shielded box. The X-ray detection unit 23 is a line sensor including X-ray detection elements that are one-dimensionally arranged along a horizontal direction perpendicular to the conveyance direction. The X-ray detection unit 23 detects X-rays transmitted through the article A and a conveying belt of the conveying unit 21.

The storage unit 24 stores a weight conversion table. The weight conversion table is used to estimate the weight of the article A based on the X-ray transmission image. In the weight conversion table, light and shade levels and estimated weights [mg] are associated with each other. In the weight conversion table, the initial value of the estimated weight is set according to the properties of the article A. The weight conversion table can be revised (changed).

The control unit 25 controls the operation of each part of the first X-ray inspection device 20. The control unit 25 includes a central processing unit (CPU), a read only memory (ROM), a random access memory (RAM), and the like. The X-ray detection result of the X-ray detection unit 23 is input to the control unit 25. The control unit 25 creates an X-ray transmission image based on the X-ray detection result.

The control unit 25 detects the weights of the individual articles A based on the X-ray transmission image and the weight conversion table stored in the storage unit 24. The control unit 25 binarizes the X-ray transmission image with a predetermined threshold value to generate a binary image. The control unit 25 estimates the weights of the articles A based on light and shade information of the individual articles A in the binary image. The control unit 25 reads out estimated weights, which correspond to the light and shade levels of pixels of the article A, from the conversion table, and adds the readout estimated weights of the pixels to calculate the weight of the article A.

When the weights of the articles A are calculated, the control unit 25 inspects whether or not the average value over a certain time period of the unit weight values of the articles A is in an allowable weight range. The allowable weight range is such that the lower limit value and the upper limit value of the weights of the articles A are set. The allowable weight range can be revised. When it is determined that the average value over the certain time period of the unit weight values is not in the allowable weight range, the control unit 25 outputs instruction information to a sorting device (not illustrated), which is disposed downstream of the first X-ray inspection device 20 in a conveyance path, such that defective articles A are sorted out of a production line by the sorting device. When it is determined that the average value over the certain time period of the unit weight values is in the allowable weight range, the control unit 25 causes the sorting device to allow the articles A to pass therethrough to be supplied to the conveying device 30 as they are. The control unit 25 outputs the inspection result to the management device 90.

When table revision information is output from the management device 90, the control unit 25 revises the weight conversion table, which is stored in the storage unit 24, based on the table revision information. When range revision information is output from the management device 90, the control unit 25 revises the allowable weight range (the lower limit value and the upper limit value).

Figure 3:
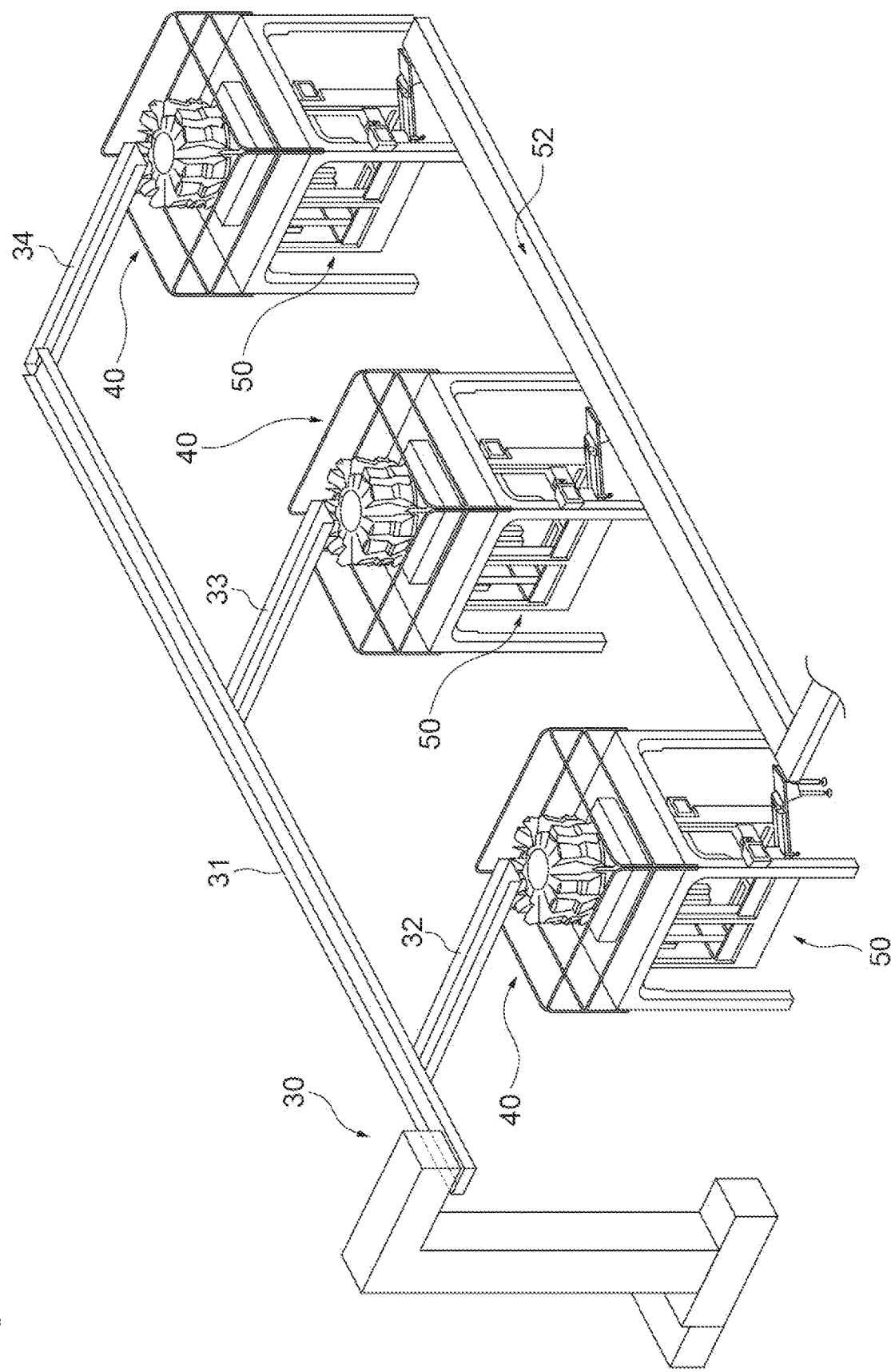
FIG. 3 is a view illustrating a configuration of a conveying device.

As illustrated in FIG. 3, the conveying device 30 conveys the article A from the first X-ray inspection device 20 to each of the plurality of combined weighing devices 40 to supply the article A to the combined weighing device 40. The conveying device 30 includes a first conveying unit 31, a second conveying unit 32, a third conveying unit 33, and a fourth conveying unit 34. Each of the first conveying unit 31, the second conveying unit 32, the third conveying unit 33, and the fourth conveying unit 34 conveys the articles A, for example, by vibration.

The first conveying unit 31 is a main conveyance path that conveys the articles A, which have passed through the first X-ray inspection device 20, to the second conveying unit 32, the third conveying unit 33, and the fourth conveying unit 34. The first conveying unit 31 extends, for example, along an arrangement direction of the plurality of combined weighing devices 40.

The second conveying unit 32, the third conveying unit 33, and the fourth conveying unit 34 are sub-conveyance paths that branch from the first conveying unit 31 to convey the articles A. The second conveying unit 32, the third conveying unit 33, and the fourth conveying unit 34 each convey the articles A to the corresponding combined weighing devices 40. The second conveying unit 32 is connected to an upstream side of the first conveying unit 31 in the conveyance direction. The third conveying unit 33 is connected to a downstream side of the first conveying unit 31 with respect to the second conveying unit 32 in the conveyance direction. The fourth conveying unit 34 is connected to a downstream side of the first conveying unit 31 with respect to the third conveying unit 33 in the conveyance direction.

The plurality of combined weighing devices 40 each have the same configuration. In the following description, one combined weighing device 40 which receives the articles A supplied from the second conveying unit 32 of the conveying device 30 will be specifically described as one example.

Figure 4:
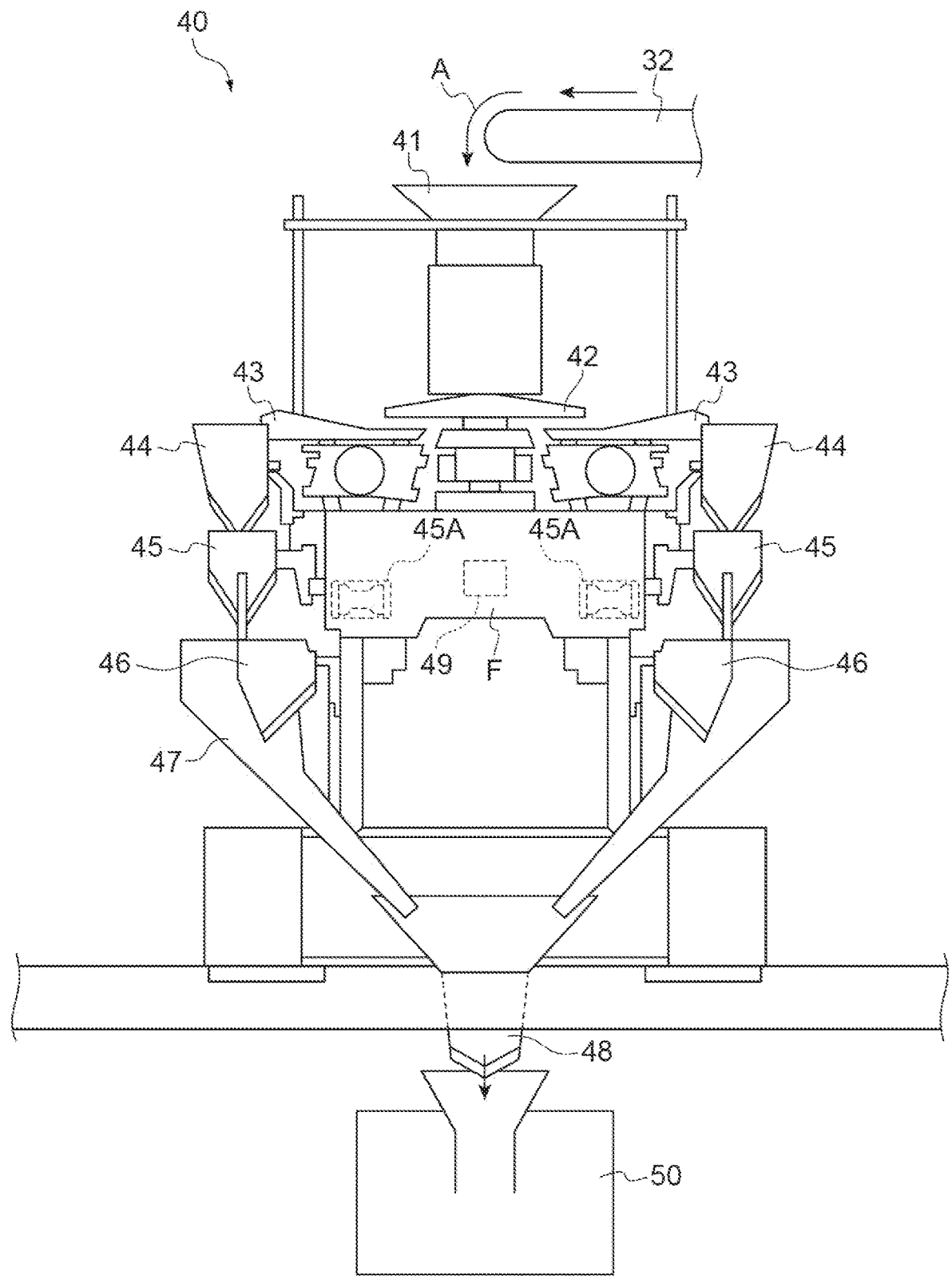
FIG. 4 is a view illustrating a configuration of a combined weighing device.

As illustrated in FIG. 4, the combined weighing device 40 includes a charging chute 41, a dispersion table 42, a plurality of radial feeders 43, a plurality of pool hoppers 44, a plurality of weighing hoppers 45, a load cell 45A, a plurality of booster hoppers 46, a collecting chute 47, a timing hopper 48, and a control unit 49. The combined weighing device 40 weighs the articles A, which are supplied by the conveying device 30, so as to acquire a target weighing value, and supplies the articles A to the bag making and packaging device 50.

The charging chute 41 is disposed below a conveyance end of the second conveying unit 32. The charging chute 41 is a cylindrical member including an inner hollow portion, on upper and lower sides of which openings are formed. The articles A which have fallen from the conveyance end of the second conveying unit 32 are charged into the inner hollow portion of the charging chute 41. The articles A which have fallen to the inner hollow portion are discharged to the dispersion table 42 via the opening on the lower side.

The dispersion table 42 is disposed below the charging chute 41. The dispersion table 42 has a conveyance surface having a conical shape which widens downward. As the conveyance surface rotates, the dispersion table 42 conveys the articles A, which are discharged from the charging chute 41, to the radial feeders 43. The plurality of radial feeders 43 are radially disposed along an outer edge of the dispersion table 42. Each of the radial feeders 43 conveys the articles A to the pool hopper 44 by vibration.

The pool hoppers 44 are disposed below tip portions of the respective radial feeders 43. Each of the pool hoppers 44 temporarily stores the article A discharged from the corresponding radial feeder 43, and discharges the temporarily stored article A downward. The weighing hoppers 45 are disposed below the respective pool hoppers 44. Each of the weighing hoppers 45 temporarily stores the article A discharged from the corresponding pool hopper 44, and discharges the temporarily stored article A downward.

A plurality of the load cells 45A are disposed inside a frame F. Each of the load cells 45A supports the corresponding weighing hopper 45. When each of the weighing hoppers 45 temporarily stores the article A, each of the load cells 45A measures a weighing value according to the weight of the article A. The booster hoppers 46 are disposed below the respective weighing hoppers 45. Each of the booster hoppers 46 temporarily stores the article A discharged from the corresponding weighing hopper 45, and discharges the temporarily stored article A downward.

The collecting chute 47 is formed in a truncated cylindrical cone shape that tapers downward. The collecting chute 47 is disposed to be located below all the weighing hoppers 45 and all the booster hoppers 46. The collecting chute 47 receives the article A discharged from each of the weighing hoppers 45 and the article A discharged from each of the booster hoppers 46 to discharge the articles A downward. The timing hopper 48 is disposed below the collecting chute 47. The timing hopper 48 temporarily stores the articles A discharged from the collecting chute 47, and discharges the temporarily stored articles A to the bag making and packaging device 50.

The control unit 49 is disposed, for example, inside the frame F. The control unit 49 is a device that controls various operations in the combined weighing device 40, and includes a CPU, a ROM, a RAM, and the like. The control unit 49 performs combined weighing. The control unit 49 selects a combination of weighing values from a plurality of weighing values, which are measured by the load cells 45A and associated with the plurality of respective weighing hoppers 45 and/or the plurality of respective booster hoppers 46, such that the total value becomes the target weighing value. Specifically, the control unit 49 selects a combination of weighing values from a plurality of weighing values, which are output by the load cells 45A, such that the total value falls in a predetermined range having the target weighing value as a combination lower limit value. More specifically, the control unit 49 selects a combination of weighing values so as to acquire a target weighing value obtained by adding a correction value to the lower limit value. The control unit 49 discharges the articles A to the weighing hoppers 45 and/or the booster hoppers 46 corresponding to the combination.

The correction value is set in advance. The correction value can be revised. The correction value is revised based on correction value revision information output from the management device 90. When correction value revision information is output from the management device 90, the control unit 49 revises the correction value based on the correction value revision information.

As illustrated in FIG. 1, while the bag making and packaging device 50 molds a film into bags each having a predetermined capacity, the bag making and packaging device 50 packages a plurality of the articles A, which are weighed by and supplied from the combined weighing device 40, in a bag. Products B discharged from each of the bag making and packaging devices 50 are merged and conveyed to the weight inspection device 60 by a conveying device 52. The weight inspection device 60 inspects the weight of the product B that is a package containing the articles A. The weight inspection device 60 outputs the inspection result to the management device 90.

The second X-ray inspection device 70 inspects the product B. While the second X-ray inspection device 70 conveys the product B which has been inspected by the weight inspection device 60, the second X-ray inspection device 70 generates an X-ray transmission image (second X-ray image) of the product B to inspect the product B based on the X-ray transmission image. In the present embodiment, the second X-ray inspection device 70 inspects the number of a plurality of the articles A in the product B.

Figure 5:
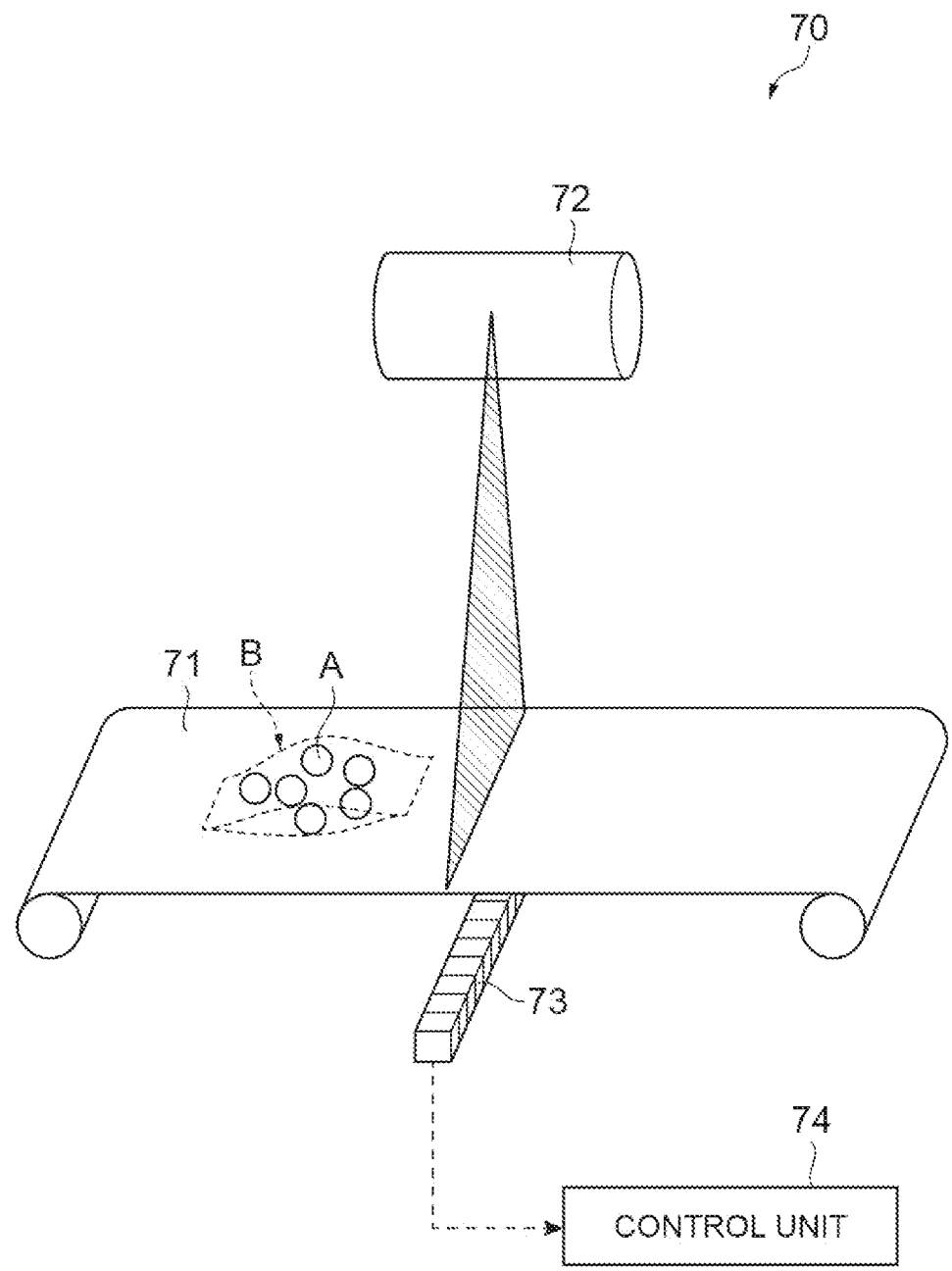
FIG. 5 is a view illustrating a configuration of a second X-ray inspection device.

As illustrated in FIG. 5, the second X-ray inspection device 70 includes a conveying unit 71, an X-ray irradiation unit 72, an X-ray detection unit 73, and a control unit 74. The conveying unit 71, the X-ray irradiation unit 72, and the X-ray detection unit 73 have the same configurations as those of the conveying unit 21, the X-ray irradiation unit 22, and the X-ray detection unit 23 of the first X-ray inspection device 20, respectively.

The control unit 74 controls the operation of each part of the second X-ray inspection device 70. The control unit 74 includes a CPU, a ROM, a RAM, and the like. The X-ray detection result of the X-ray detection unit 73 is input to the control unit 74. The control unit 74 creates an X-ray transmission image based on the X-ray detection result.

The control unit 74 binarizes the X-ray transmission image with a predetermined threshold value to generate a binary image. The control unit 74 detects the number of the articles A based on light and shade information of the individual articles A in the binary image. A known method can be used to detect the number of the articles A. For example, the control unit 74 divides the articles A into individuals based on the light and shade information of the binary image, to detect the number of the articles A. The control unit 74 outputs the inspection result (number of the articles A) to the management device 90.

As illustrated in FIG. 1, the box packing device 80 is a device that packs the products B in a corrugated box.

The management device 90 manages the article production device 10, the first X-ray inspection device 20, the conveying device 30, the plurality of combined weighing devices 40, the bag making and packaging device 50, the weight inspection device 60, the second X-ray inspection device 70, and the box packing device 80. The management device 90 includes a CPU, a ROM, a RAM, and the like. As illustrated in FIG. 6, the management device 90 includes an acquisition unit 91, a control unit 92, and an output unit 93.

The acquisition unit 91 acquires an inspection result output from each device. Specifically, the acquisition unit 91 acquires the inspection result output from the first X-ray inspection device 20, the inspection result output from the weight inspection device 60, and the inspection result output from the second X-ray inspection device 70. The acquisition unit 91 outputs the acquired inspection results to the control unit 92.

The control unit 92 changes the setting of a predetermined value and the like set in each device. The control unit 92 calculates the average value of the weights of the products B from the result of the inspection over a certain time period in the weight inspection device 60. The certain time period is, for example, from 10 minutes to 15 minutes. The control unit 92 revises the weight conversion table stored in the storage unit 24 of the first X-ray inspection device 20 and the correction value of the combined weighing device 40 based on the calculated average value of the weights of the products B.

When the average value of the weights of the products B is larger than the specified value (for example, 400 g or the like) of the weight of the product B, the control unit 92 sets the values of the estimated weights for light and shade levels to smaller values in the weight conversion table. The control unit 92 outputs information about the set estimated weights to the output unit 93 as table revision information that instructs the revision of the weight conversion table stored in the storage unit 24 of the first X-ray inspection device 20.

The control unit 92 sets the correction value based on a difference between the target weighing value of the combined weighing device 40 and the average value of the weights of the products B. The control unit 92 sets an optimum correction value based on the difference between the target weighing value and the average value. The optimum correction value is set based on the specified value of the weight of the product B, the operation rate and the yield rate of the combined weighing device 40, and the like. The control unit 92 outputs information about the set correction value to the output unit 93 as correction value revision information that instructs the revision of the correction value of the combined weighing device 40.

The control unit 92 calculates the average value of the unit weight values of the articles A, which are packaged in the product B, based on the inspection result of the weight inspection device 60 and the detection result of the second X-ray inspection device 70. The control unit 92 calculates the average value of the unit weight values of the articles A by dividing the weighing value of the product B, which is measured by the weight inspection device 60, by the number of the articles A detected by the second X-ray inspection device 70. The control unit 92 sets the allowable weight range of the first X-ray inspection device 20 based on the average value. The control unit 92 sets the lower limit value and/or the upper limit value of the allowable weight range based on the average value. The control unit 92 outputs information about the set allowable weight range to the output unit 93 as range revision information that instructs the revision of the allowable weight range of the first X-ray inspection device 20.

Figure 7:
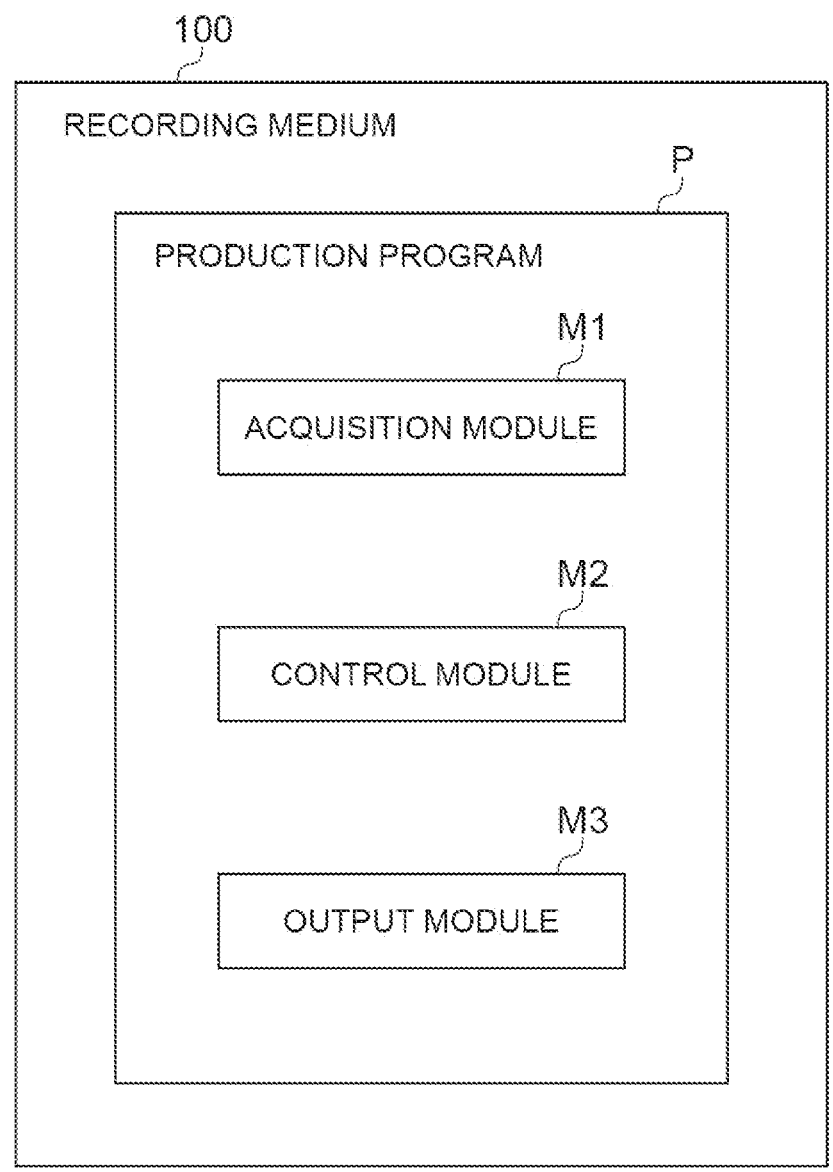
FIG. 7 is a diagram illustrating a configuration of a combined weighing program stored in a storage medium.

Subsequently, a combined weighing program P which realizes the combined weighing system 1 (combined weighing method) will be described. As illustrated in FIG. 7, the combined weighing program P can be recorded on a recording medium 100 that is readable by a computer. The combined weighing program P stored in the recording medium 100 includes an acquisition module M1, a control module M2, and an output module M3. The combined weighing program P functions by causing the computer to execute the acquisition module M1, the control module M2, and the output module M3. The functions realized by executing the acquisition module M1, the control module M2, and the output module M3 are the same as the functions of the acquisition unit 91, the control unit 92, and the output unit 93, respectively.

The combined weighing program P is recorded in a program recording region of the recording medium 100. The recording medium 100 is formed of a recording medium such as a CD-ROM, a DVD, a ROM, or a semiconductor memory. The combined weighing program P may be provided via a communication network as a computer data signal superimposed on a carrier wave.

As described above, in the combined weighing system 1 according to the present embodiment, the weight conversion table of the first X-ray inspection device 20 and the correction value of the combined weighing device 40 are revised based on the average value of the weights of the products B, which is calculated from the result of the inspection over a certain time period in the weight inspection device 60. Accordingly, in the combined weighing system 1, the weight conversion table and the correction value can be appropriately set. Therefore, in the combined weighing system 1, the accuracy of the inspection performed by the first X-ray inspection device 20 and the accuracy of the combination performed by the combined weighing device 40 can be improved. In addition, in the combined weighing system 1, the allowable weight range of the first X-ray inspection device 20 is revised based on the average value of the unit weight values of the articles A, which is calculated from the inspection result of the weight inspection device 60 and the detection result of the second X-ray inspection device 70. Accordingly, in the combined weighing system 1, the allowable weight range can be appropriately set. Therefore, in the combined weighing system 1, the weights of the articles A to be supplied to the combined weighing device 40 can be appropriately set, and the accuracy of the combined weighing in the combined weighing device 40 can be improved.

The embodiment of the present invention has been described above; however, the present invention is not limited to the above-described embodiment, and various changes can be made without departing from the concept of the present invention.

In the embodiment, a mode in which the article A is a croquette has been described as one example. However, the article A may be other foods. The article A may be a processed article other than a food.

In the embodiment, a mode in which each of the first conveying unit 31, the second conveying unit 32, the third conveying unit 33, and the fourth conveying unit 34 of the conveying device 30 conveys the articles A by vibration has been described as one example. However, each of the first conveying unit 31, the second conveying unit 32, the third conveying unit 33, and the fourth conveying unit 34 may be, for example, a belt conveyor.

In the embodiment, a mode in which the combined weighing system 1 includes three combined weighing devices 40 has been described as one example. However, the number of the combined weighing devices 40 is not limited to 3. The number of the combined weighing devices 40 may be 1 or 2, or may be 4 or more.

In the embodiment, a mode in which in the combined weighing device 40, the articles A are conveyed to the radial feeders 43 by the rotation of the conveyance surface of the dispersion table 42 has been described as one example. However, the dispersion table 42 may convey the articles A by vibration. In addition, a mode in which the plurality of radial feeders 43 convey the articles A by vibration has been described as one example. However, the radial feeder 43 may adopt a mode in which the articles A are conveyed by a coil unit (screw) that can be rotationally driven or a belt conveyor.

In the embodiment, a mode in which the combined weighing device 40 includes the booster hoppers 46 has been described as one example. However, the combined weighing device 40 may not include the booster hoppers 46. In this case, the control unit 49 selects a combination of weighing values from a plurality of weighing values, which are measured by the load cells 45A and associated with the plurality of respective weighing hoppers 45, such that the total value becomes the target weighing value.

In the embodiment, a mode in which the article production device 10 includes the mixer 12, the molding machine 14, the battering machine 16, and the fryer 18 has been described as one example. However, the configuration of the article production device is not limited thereto. The article production device may be such that machines are set according to an article to be produced.

In the embodiment, a mode in which the combined weighing system 1 includes the box packing device 80 has been described as one example. However, the combined weighing system may not include the box packing device 80. In addition, the combined weighing system may further include a seal inspection device that detects abnormalities in the bags which are made and packaged by the bag making and packaging device 50, a metal inspection device that inspects whether or not metal is mixed with the articles A contained in the product B, and the like.

REFERENCE SIGNS LIST

1: combined weighing system, 20: first X-ray inspection device, 40: combined weighing device, 50: bag making and packaging device, 60: weight inspection device, 70: second X-ray inspection device, A: article, B: product (package).

The invention claimed is:
1. A combined weighing system comprising:
a first X-ray inspection device that irradiates articles with X-rays to acquire first X-ray images, detects weights of the articles based on the first X-ray images and a weight conversion table set in advance, and inspects whether or not an average value over a certain time period of unit weight values is in an allowable weight range, the unit weight value representing a weight of one article;
a combined weighing device that performs combined weighing on the articles, which have been inspected by the first X-ray inspection device, so as to acquire a weight obtained by adding a correction value to a combination lower limit value, and supplies the articles on which the combined weighing has been performed;
a packaging device that packages a plurality of the articles, which are combined by the combined weighing device, in a bag;
a weight inspection device that inspects weights of packages in each of which the plurality of articles are packaged in the bag;
a second X-ray inspection device that irradiates the packages, which have been inspected by the weight inspection device, with X-rays to acquire second X-ray images, and inspects the number of the plurality of articles in each of the packages based on the corresponding second X-ray image; and
a management device that manages each device,
wherein the management device revises the weight conversion table of the first X-ray inspection device and the correction value of the combined weighing device based on an average value of the weights of the packages, which is calculated from a result of the inspection over a certain time period in the weight inspection device.

2. The combined weighing system according to claim 1, wherein the management device revises the allowable weight range of the first X-ray inspection device based on the average value of the unit weight values of the articles, which is calculated from the inspection result of the weight inspection device and a detection result of the second X-ray inspection device.

3. A combined weighing method to be executed by a combined weighing system including a first X-ray inspection device that irradiates articles with X-rays to acquire first X-ray images, detects weights of the articles based on the first X-ray images and a weight conversion table set in advance, and inspects whether or not an average value over a certain time period of unit weight values is in an allowable weight range, the unit weight value representing a weight of one article,
a combined weighing device that performs combined weighing on the articles, which have been inspected by the first X-ray inspection device, so as to acquire a weight obtained by adding a correction value to a combination lower limit value, and supplies the articles on which the combined weighing has been performed,
a packaging device that packages a plurality of the articles, which are combined by the combined weighing device, in a bag,
a weight inspection device that inspects weights of packages in each of which the plurality of articles are packaged in the bag,
a second X-ray inspection device that irradiates the packages, which have been inspected by the weight inspection device, with X-rays to acquire second X-ray images, and inspects the number of the plurality of articles in each of the packages based on the corresponding second X-ray image, and a management device that manages each device, wherein the management device revises the weight conversion table of the first X-ray inspection device and the correction value of the combined weighing device based on an average value of the weights of the packages, which is calculated from a result of the inspection over a certain time period in the weight inspection device.

4. The combined weighing method according to claim 3, wherein the management device revises the allowable weight range of the first X-ray inspection device based on the average value of the unit weight values of the articles, which is calculated from the inspection result of the weight inspection device and a detection result of the second X-ray inspection device.

5. A combined weighing program that causes a computer of a management device to execute functions in a combined weighing system including a first X-ray inspection device that irradiates articles with X-rays to acquire first X-ray images, detects weights of the articles based on the first X-ray images and a weight conversion table set in advance, and inspects whether or not an average value over a certain time period of unit weight values is in an allowable weight range, the unit weight value representing a weight of one article, a combined weighing device that performs combined weighing on the articles, which have been inspected by the first X-ray inspection device, so as to acquire a weight obtained by adding a correction value to a combination lower limit value, and supplies the articles on which the combined weighing has been performed, a packaging device that packages a plurality of the articles, which are combined by the combined weighing device, in a bag, a weight inspection device that inspects weights of packages in each of which the plurality of articles are packaged in the bag, a second X-ray inspection device that irradiates the packages, which have been inspected by the weight inspection device, with X-rays to acquire second X-ray images, and inspects the number of the plurality of articles in each of the packages based on the corresponding second X-ray image, and the management device that manages each device, wherein the weight conversion table of the first X-ray inspection device and the correction value of the combined weighing device are revised based on an average value of the weights of the packages, which is calculated from a result of the inspection over a certain time period in the weight inspection device.

6. The combined weighing program according to claim 5, wherein the allowable weight range of the first X-ray inspection device is revised based on the average value of the unit weight values of the articles, which is calculated from the inspection result of the weight inspection device and a detection result of the second X-ray inspection device.

* * * * *